March 6, 1962  W. J. TESCHE  3,023,547
ULTRASONIC CUTTING TOOL
Filed Dec. 7, 1959
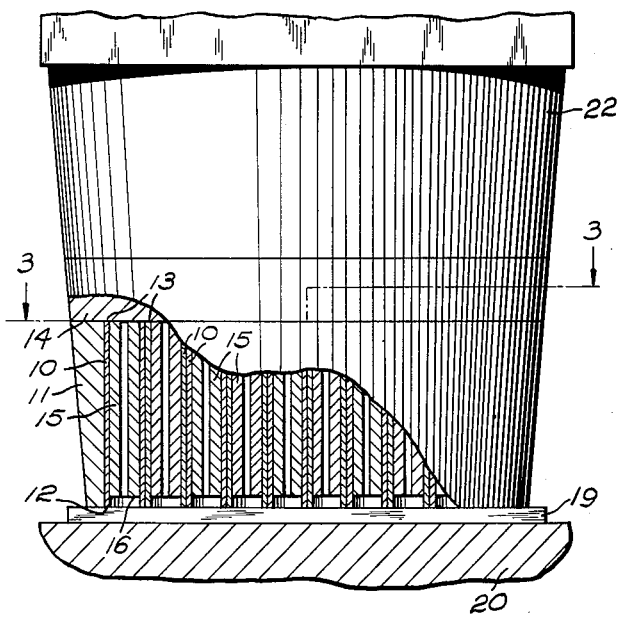
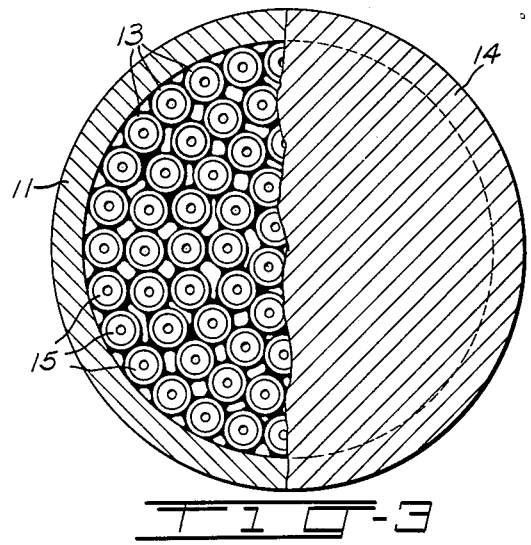
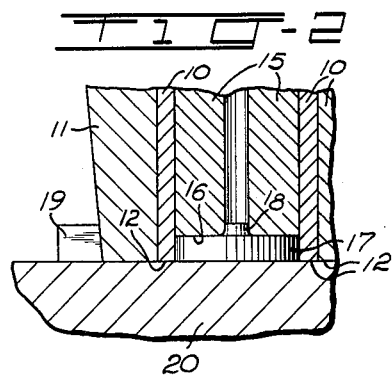
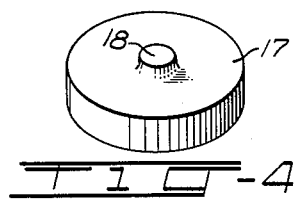
INVENTOR
W. J. TESCHE
By S. Gundersen
ATTORNEY ULTRASONIC CUTTING TOOL
Walter J. Tesche, Coopersburg, Pa., assignor to Western Electric Company, Incorporated, New York, N.Y., a corporation of New York
Filed Dec. 7, 1959, Ser. No. 857,623
5 Claims. (Cl. 51—59)

This invention relates to cutting tools and particularly to a tool for ultrasonically cutting a plurality of articles from a slice of hard brittle material in a single operation, such as, the formation of mesa type semi-conductor wafers for transistors.

In the mass production of mesa type wafers, the small dimensions and associated close tolerances required for obtaining proper electrical characteristics necessitate the use of highly accurate cutting tools. For instance, a particular coded wafer has a 0.0045 inch thick base portion with a diameter of 0.030 inch and a raised mesa portion centrally located on the base with a height of 0.0025 inch and a diameter of 0.005 inch. Heretofore, the base and mesa were fabricated by two separate ultrasonic cutting operations and resulted in such problems as holding concentricity of the mesa with respect to the wafer base and accurately measuring depth of cut for the proper mesa height.

The object of this invention is to overcome the above problems and accurately cut a multitude of mesa type wafers in a single operation.

In accordance with the general features of the invention, a tool for cutting a plurality of similar articles from a slice of material of predetermined thickness includes a plurality of tubular elements nested together with the working ends thereof in a common plane for cutting peripheral base portions of the articles. A shorter tube is recessed within each element a predetermined distance from the working end thereof so that the tube end cuts the top surface of the base thereby leaving a desired elevated portion thereon defined by the aperture within the tube.

In a preferred embodiment, a tool for simultaneously cutting a plurality of circular mesa type semi-conductor wafers in a single operation comprises a plurality of lengths of tubing of circular cross section and having an inner diameter equal to that of the desired wafer diameter. The tubes are nested in a retaining ring with their working ends in co-planar relationship, the other ends being secured to an ultrasonic driver unit. Each section of tubing has tightly fitted therein a shorter tube having a bore equal to the desired mesa diameter, the cutting end of the shorter tube being recessed in the lengths of tubing a distance equal to the desired thickness of the peripheral portion of the wafer. When the tool is vibrated, the ends of the shorter tubes cause an abrasive to cut the mesas and the ends of the tubing cause the wafers to be cut from the slice. By using slices of proper uniform thickness, the mesas will be the correct height when the wafers are fully cut from the slice.

Other objects and a fuller understanding of the invention may be had by referring to the following description and claims, taken in conjunction with the following drawing, in which:

FIG. 1 is a fragmentary elevational view of the tool in its non-cutting position;

FIG. 2 is an enlarged sectional view of one unit of the tool after completing a cutting operation;

FIG. 3 is a plan view taken along line 3—3 of FIG. 1; and

FIG. 4 is a perspective view of the formed mesa wafer.

With reference to the accompanying drawing, the tool, as shown in FIGS. 1–3, is utilized to produce a mesa type wafer, as seen in FIG. 4, having a base portion 17 with a prescribed diameter and thickness and a mesa 18 centrally located thereon also having a prescribed diameter and thickness. The tool includes a plurality of identical lengths of outer tubes 10 nested in a container, such as a retaining ring 11. The tubes 10 are held in fixed relationship to each other by soldering the outer wall of one tube to the outer wall of adjacent tubes. Hereinafter, a single tube and its components will be described as each tube unit within the ring 11 is similarly structured. The tube 10 has a circular cutting end portion 12 and an opposing end 13 connected to a tool holder 14, the ends 12 and 13 being in co-planar relationship to each other. Within each outer tube 10 is tightly fitted a smaller diameter size tube 15 whose cutting end 16 is recessed from the outer tube cutting end 12 a distance equal to the slice thickness minus the desired mesa height in order to obtain the desired thickness of the wafer base 17. The inner diameter of the outer tube 10 is equal to the diameter of the desired wafer base 17, while the inner diameter of the inner tube 15 is the diameter of the desired mesa 18. Thus with this arrangement, the desired diameter of the mesa and wafer base and the desired thickness of the wafer base are preset in the cutting tool.

In operation, a slice of hard brittle material 19, such as silicon, is placed on a fixed platform 20 submerged in an abrasive slurry, such as boron carbide. A transducer 22, adapted to vibrate at a high frequency, is connected to the tool holder 14 and upon the activation thereof, a vibratory movement is imparted through the holder 12 to the tubes 10 and 15 causing the cutting end portions 12 and 16 to cut through the material 19. The thickness of the material 19 is predetermined to correspond to the total height of the mesa 18 and the wafer base 17 so that when the mesa cut is being made and the outer tube just passes through the bottom of the slice, the height of the mesa and wafer automatically are obtained due to the inner tube's cutting end 16 being recessed a distance equal to the slice thickness minus the desired mesa height. Thus, when the slice is completely cut through, the desired base and mesa dimensions of the wafer are uniform and accurately produced.

It is to be noted that while a particular configuration in the form of a circular wafer base and mesa results, it will be apparent that other configurations can be obtained by merely changing the configuration of the tubular elements. For example, it may be desirable to obtain an object having a square, rectangular, or triangular base with a corresponding or different form of mesa thereon and consequently a square, rectangular, or triangular tube is utilized in place of the tubes 10 and 15 for cutting one surface of the material with respect to the other. In this manner, an article having varying peripheral and elevated portions can be readily and accurately formed simultaneously in large numbers by a single composite tool in one cutting operation.

Thus, although the invention has been described with a certain degree of particularity, it is understood that the present disclosure has been made only by way of example and that numerous changes in the details of construction and the combination of arrangements of parts may be resorted to without departing from the spirit and scope of the invention as hereinafter claimed.

What is claimed is:

1. A tool for use with an ultrasonic driver unit for cutting simultaneously a plurality of similarly shaped articles in which a base portion thereof is cut with respect to an elevated portion thereon from a slice of material of predetermined thickness, which comprises, a plurality of outer members having cutting ends in a common plane, the ends having a cross sectional configuration of the desired peripheral base portion, and an apertured member recessed within each outer member a distance equal to the desired base thickness for cutting the top surface of the base portion in order to obtain the desired thickness thereof, the internal surface of the apertured member having a cross sectional configuration similar to that of the desired elevated portion.

2. A tool for use with an ultrasonic driver unit for cutting simultaneously a plurality of similarly shaped articles in which a base portion thereof is cut with respect to an elevated portion thereon from a slice of material of predetermined thickness, which comprises, a container, a plurality of outer members nested within the container whose cutting ends are in the same plane and having a cross sectional configuration of the desired peripheral base portion, means for connecting the outer members with respect to one another, an apertured member recessed within each outer member a distance equal to the desired base thickness for cutting the top surface of the base portion in order to obtain the desired thickness thereof, the internal surface of the apertured member having a cross sectional configuration similar to that of the desired elevated portion.

3. A tool for use with an ultrasonic driver unit for cutting simultaneously a plurality of similarly shaped mesa type wafers of uniform dimension from a slice of material having a predetermined thickness, in an abrasive medium, which comprises, a plurality of first tubes having cutting ends in a common plane and an inner diameter equal to that of the desired diameter of the wafer base a second tube having cutting ends in a common plane and an inner diameter equal to that of the desired mesa diameter, the second tube recessed within the cutting end of each first tube a distance equal to the slice thickness minus the desired mesa height for obtaining the desired thickness of the water base.

4. A tool for use with an ultrasonic driver unit for cutting simultaneously a plurality of mesa type wafers of uniform dimension from a slice of material having a predetermined thickness, in a abrasive medium, which comprises, a container, a plurality of first tubes nested within the container whose cutting ends are in the same plane and having an inner diameter of the desired wafer diameter, means for securing the tubes in fixed relationship one to another, a second tube having cutting ends in a common plane and an inner diameter of the desired mesa diameter, the second tube recessed within the cutting end of each first tube a distance equal to the slice thickness minus the desired mesa height for obtaining the desired thickness of the wafer base.

5. A tool for use with an ultrasonic driver unit for cutting simultaneously a plurality of similarly shaped mesa type wafers of uniform dimension from a slice of material having a predetermined thickness, in an abrasive medium, which comprises, a retaining ring, a plurality of first tubes nested within the ring and having an inner diameter of the prescribed wafer diameter the cutting ends thereof in co-planar relationship to each other means for securing the tubes in fixed relationship one to another, a second tube having an inner diameter of the prescribed mesa diameter and recessed within one end of each first tube a distance equal to the slice thickness minus the prescribed mesa height for obtaining the desired thickness of the wafer base the cutting ends thereof in co-planar relationship to each other and means for securing the other end of the first and second tubes in contact with the driver unit for imparting vibratory movement through the tubes causing the cutting ends thereof to cut through the slice and automatically form the prescribed dimension of the wafer base with respect to the prescribed dimension of the mesa thereon.

References Cited in the file of this patent

UNITED STATES PATENTS

| | | |
|---|---|---|
| 2,135,900 | Kulp | Nov. 8, 1938 |
| 2,774,194 | Thatcher | Dec. 18, 1956 |
| 2,825,186 | Palush | Mar. 4, 1958 |